(12) United States Patent
Abreu et al.

(10) Patent No.: US 9,281,966 B2
(45) Date of Patent: Mar. 8, 2016

(54) METHOD, SYSTEM AND APPARATUS FOR THE CONTROL OF TRANSMIT DIVERSITY

(71) Applicant: GOOGLE INC., Mountain View, CA (US)

(72) Inventors: Eduardo Abreu, Allentown, PA (US); Yair Karmi, Bridgewater, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/166,425

(22) Filed: Jan. 28, 2014

(65) Prior Publication Data

US 2014/0140441 A1  May 22, 2014

Related U.S. Application Data

(63) Continuation of application No. 13/493,645, filed on Jun. 11, 2012, now Pat. No. 8,670,455, which is a continuation of application No. 11/637,148, filed on Dec. 12, 2006, now Pat. No. 8,199,735.

(51) Int. Cl.
*H04L 5/00* (2006.01)
*H04L 25/02* (2006.01)
*H04B 7/06* (2006.01)

(52) U.S. Cl.
CPC . *H04L 25/02* (2013.01); *H04B 7/06* (2013.01)

(58) Field of Classification Search
CPC combination set(s) only.
See application file for complete search history.

(56) References Cited

U.S. PATENT DOCUMENTS

| | | |
|---|---|---|
| 5,282,239 A | 1/1994 | Yokoi |
| 5,345,600 A | 9/1994 | Davidson |
| 5,642,353 A | 6/1997 | Roy et al. |
| 5,729,826 A | 3/1998 | Gavrilovich et al. |
| 5,832,044 A | 11/1998 | Sousa et al. |

(Continued)

FOREIGN PATENT DOCUMENTS

| | | |
|---|---|---|
| EP | 0 986 193 | 3/2000 |
| EP | 1 282 242 | 2/2003 |

(Continued)

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

(Continued)

*Primary Examiner* — Fan Ng
(74) *Attorney, Agent, or Firm* — Troutman Sanders LLP; James E. Schutz; Christopher C. Close, Jr.

(57) ABSTRACT

A method, apparatus and system for modifying a transmit diversity signal comprising receiving at least one input parameter, calculating at least one virtual parameter based on the at least one input parameter, converting the at least one virtual parameter into an actual parameter, and modifying a transmit diversity signal based on the actual parameter. Variations of the invention are possible, including mapping the input parameter to an actual parameter by various methods, for example, quantization, hysteresis and other methods. Embodiments of the invention may include an apparatus adapted to modify a transmit diversity signal comprising a processor to calculate at least one virtual parameter based on at least one input parameter, convert said at least one virtual parameter to an actual parameter, and modify said transmit diversity signal based on said actual parameter.

27 Claims, 7 Drawing Sheets

(56) References Cited

U.S. PATENT DOCUMENTS

| | | | |
|---|---|---|---|
| 5,982,760 | A | 11/1999 | Chen et al. |
| 5,991,330 | A | 11/1999 | Dahlman et al. |
| 5,999,826 | A | 12/1999 | Whinnett et al. |
| 6,185,440 | B1 | 2/2001 | Barratt et al. |
| 6,226,509 | B1 | 5/2001 | Mole et al. |
| 6,236,363 | B1 | 5/2001 | Robbins et al. |
| 6,243,585 | B1 | 6/2001 | Pelech et al. |
| 6,330,294 | B1 | 12/2001 | Ansbro et al. |
| 6,343,218 | B1 | 1/2002 | Kaneda et al. |
| 6,392,988 | B1 | 5/2002 | Allpress et al. |
| 6,492,942 | B1 | 12/2002 | Kezys |
| 6,636,495 | B1 | 10/2003 | Tangemann |
| 6,704,370 | B1 | 3/2004 | Chheda et al. |
| 6,745,009 | B2 | 6/2004 | Raghothaman |
| 6,754,473 | B1 | 6/2004 | Choi et al. |
| 6,810,264 | B1 | 10/2004 | Park et al. |
| 6,882,228 | B2 | 4/2005 | Rofougaran |
| 6,915,116 | B2 | 7/2005 | Wang et al. |
| 7,499,709 | B2 | 3/2009 | Das et al. |
| 7,660,598 | B2 | 2/2010 | Barnett et al. |
| 7,729,714 | B2 | 6/2010 | Black et al. |
| 8,199,735 | B2 * | 6/2012 | Abreu ............... H04B 7/06 370/252 |
| 8,670,455 | B2 * | 3/2014 | Abreu ............... H04L 25/02 370/431 |
| 2002/0038210 | A1 | 3/2002 | Yajima et al. |
| 2002/0061731 | A1 | 5/2002 | Takano et al. |
| 2003/0112880 | A1 | 6/2003 | Walton et al. |
| 2003/0148770 | A1 | 8/2003 | Das et al. |
| 2004/0048584 | A1 | 3/2004 | Vaidyanathan et al. |
| 2004/0077378 | A1 | 4/2004 | Kim et al. |
| 2004/0085239 | A1 | 5/2004 | Ukena et al. |
| 2005/0059355 | A1 | 3/2005 | Liu |
| 2005/0143113 | A1 | 6/2005 | Lee et al. |
| 2005/0215208 | A1 | 9/2005 | Stoddard et al. |
| 2005/0265433 | A1 | 12/2005 | Okumura et al. |
| 2008/0139135 | A1 * | 6/2008 | Abreu ............... H04B 7/06 455/101 |
| 2010/0070448 | A1 * | 3/2010 | Omoigui ............ H01L 27/1463 706/47 |
| 2012/0243525 | A1 * | 9/2012 | Abreu ............... H04B 7/06 370/339 |
| 2014/0140441 | A1 * | 5/2014 | Abreu ............... H04B 7/06 375/316 |

FOREIGN PATENT DOCUMENTS

| | | |
|---|---|---|
| EP | 1 282 244 | 2/2003 |
| EP | 1 284 545 | 2/2003 |
| EP | 1 262 031 | 5/2004 |
| GB | 2 353 437 | 2/2001 |
| JP | 09-238098 | 9/1997 |
| JP | 2000-151484 | 5/2000 |
| WO | WO 01/20810 | 3/2001 |
| WO | WO 2005/081444 | 9/2005 |
| WO | WO 2008/057471 | 5/2008 |

OTHER PUBLICATIONS

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

International Search Report for International Application No. PCT/US07/24850 mailed Mar. 14, 2008.

Supplementary European Search Report for European Application No. EP 07 85 3237 mailed Feb. 27, 2012.

* cited by examiner

METHOD, SYSTEM AND APPARATUS FOR THE CONTROL OF TRANSMIT DIVERSITY

CROSS REFERENCE TO RELATED APPLICATION

This application is a continuation of U.S. application Ser. No. 13/493,645 filed Jun. 11, 2012, now U.S. Pat. No. 8,670,455 which is a continuation of U.S. application Ser. No. 11/637,148 filed Dec. 12, 2006, now U.S. Pat. No. 8,199,735, which is incorporated in its entirety herein by reference.

FIELD OF THE INVENTION

The present invention relates to control of transmit diversity in wireless systems, and in particular to transmit diversity control algorithms.

BACKGROUND OF THE INVENTION

Wireless transmission systems may use transmit diversity, whereby transmission is made using a plurality of antennas to transmit the signal to a receiver. Typically, such transmit diversity systems directly compute the actual diversity parameters and implement such parameters in the transmit diversity transmission system. There is a need for an improved control of transmit diversity.

SUMMARY OF EMBODIMENTS OF THE INVENTION

Embodiments of the present invention include a method and apparatus for modifying a transmit diversity signal by receiving at least one input parameter, calculating at least one virtual parameter based on said at least one input parameter, converting said at least one virtual parameter into an actual parameter, and modifying a transmit diversity signal based on said actual parameter. In some embodiments of the invention, the actual parameter may be any one or a combination of relative phase, relative amplitude, relative power, frequency of modification, or timing of application of said transmit diversity signal.

In some embodiments of the invention, the actual parameter may have a discrete value having lower resolution than said virtual parameter. Furthermore, in some embodiments of the invention, at least one virtual parameter may be converted into an actual parameter by mapping any of a plurality of virtual parameter values to a single actual parameter value, for example, by rounding or truncating the at least one virtual parameter to obtain the actual parameter value.

In some embodiments of the invention, the at least one virtual parameter may be converted into the actual parameter by a calculation based on an amount of change in the virtual parameter, either instantaneously or over a slope-measurement time interval. In some embodiments, the at least one virtual parameter may be converted into the actual parameter if an increase in the virtual parameter over the slope-measurement time interval exceeds a threshold value, or if the absolute value of a decrease in the virtual parameter over the slope-measurement time interval exceeds a threshold value. In some embodiments of the invention, the at least one virtual parameter may be converted into the actual parameter only if no change was made to said actual parameter within a previous minimum time interval. In some embodiments of the invention, a weighted averaging of a plurality of previous virtual parameter values over said slope-measurement time interval may be performed to obtain the actual parameter.

In some embodiments of the invention, the at least one virtual parameter may be converted into an actual parameter if the at least one virtual parameter exceeds a threshold, where in one embodiment, the threshold may be based on at least one or a plurality of previous values of the virtual parameter, or in another embodiment, the threshold may be based on at least one or a plurality of previous values of the actual parameter.

In some embodiments of the invention, the at least one virtual parameter may be converted into the actual parameter based on whether a difference between the virtual parameter and an actual parameter value exceeds a hysteresis threshold value.

In some embodiments of the invention, the at least one virtual parameter may be converted into the actual parameter by performing a weighted averaging of a plurality of previous virtual parameter values over a measurement time interval. In some embodiments of the invention, the conversion calculation from the at least one virtual parameter into the actual parameter may take place at regular time intervals.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
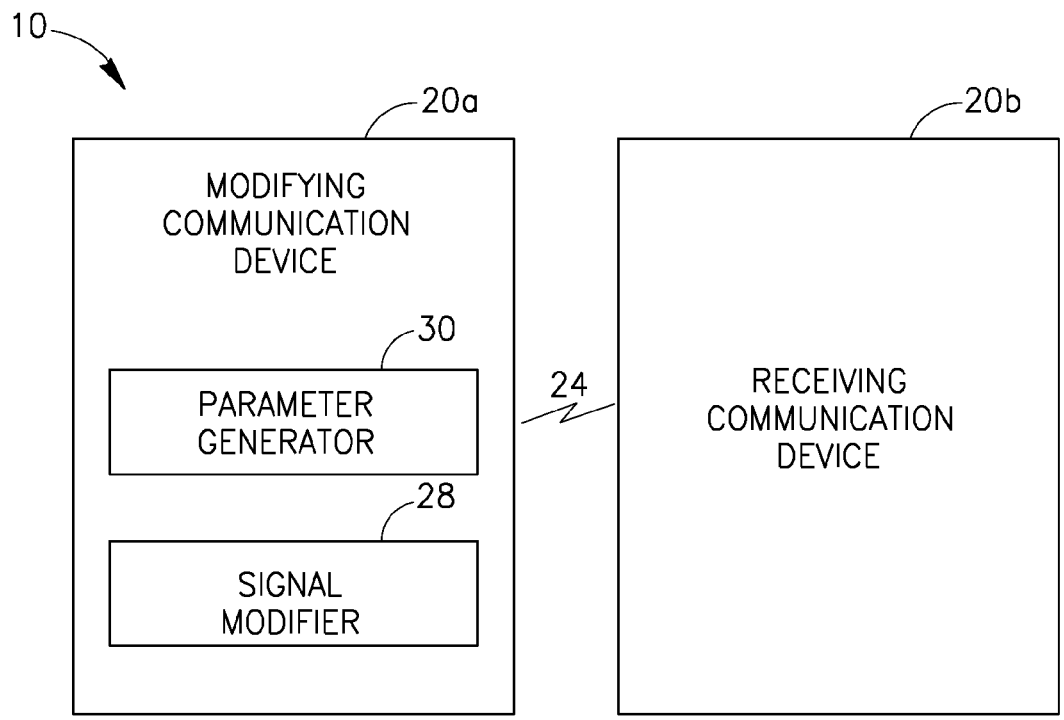
FIG. 1 depicts a block diagram of a communication network according to an embodiment of the present invention that includes one or more transmitting communication devices and one or more receiving communication devices that communicate via a wireless link.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF ILLUSTRATED EMBODIMENTS OF THE PRESENT INVENTION

Embodiments of the present invention may allow for transmit diversity control by using a system that uses virtual parameters to enhance the system throughput, by requiring less repetitions or supporting higher data rate and larger, more efficient data packets. Embodiments of the present invention may allow for a more stable system by offering a high resolution of transmit diversity parameters. Embodiments of the present invention may allow for improvement of wireless communication system capacity by offering optimized performance—from high resolution of transmit diversity parameters. Embodiments of the present invention may allow for improvement of transmission efficiency by fading mitigation and beamforming.

Embodiments of the invention may provide for better performance, measured, for example, in terms of the power the unit is required to transmit for the receiver to receive acceptable signal quality, the number of errors in the transmission, higher throughput, improved coverage, and improved stability resulting from possibly fewer changes in the diversity control parameters. In some embodiments the module implementing diversity control may have a reduced resolution requirement, possibly adding to simplicity of design, lower cost, and/or requiring less power to operate.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the present invention and its advantages are best understood by referring to FIGS. 1 through 10, like numerals being used for like and corresponding parts of the various drawings.

FIG. 1 is a block diagram illustrating a communication network 10 according to an embodiment of the present invention that includes a modifying communication device 20*a* that that adjusts a nominal value of a transmit diversity parameter. According to the embodiment, modifying communication device 20*a* may compute a virtual diversity parameter that is used to control actual transmit diversity for a signal transmitted from communication device 20*a* to receiving communication device 20*b*. Modifying communication device 20*a* may adjust a nominal value of an actual transmit diversity parameter based on the decision computed from the virtual diversity parameter.

According to the illustrated embodiment, network 10 may operate to provide services such as communication sessions. A communication session may refer to an active communication between endpoints, measured from endpoint to endpoint. Information is communicated during a communication session. Information may refer to voice, data, text, audio, video, multimedia, control, signaling, other information, or any combination of the preceding.

The information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets. A packet may comprise any suitable packet, such as a General Packet Radio Service (GPRS) packet, an Enhanced Data for GSM Evolutions (EDGE) packet, or other suitable packet.

Network 10 may utilize communication protocols and technologies to provide the communication sessions. Examples of communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, or other standards.

Devices of network 10 may use any suitable multiple access technology, for example, a code division multiple access (CDMA) technology. According to one embodiment, network 10 may operate according to a CDMA 2000 telecommunications technology that uses a single CDMA channel. As an example, a CDMA 2000 high rate data packet technology, such as the Evolution Data Only (EvDO) technology may be used.

Network 10 may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding.

A component of network 10 may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

Communication network 10 may include one or more modifying communication devices 20*a* and one or more communication devices 20*b* that communicate via a wireless link 24. Either or both of communication devices 20*a* or 20*b* may be any device operable to communicate information via signals with one or more other communication devices. For example, communication device 20*a* or 20*b* may comprise a subscriber unit or a base station. A subscriber unit may comprise any device operable to communicate with a base station, for example, a personal digital assistant, a cellular telephone, a mobile handset, a computer, or any other device suitable for communicating signals to and from a base station. A subscriber unit may support, for example, Session Initiation Protocol (SIP), Internet Protocol (IP), or any other suitable communication protocol.

A base station provides a subscriber unit access to a communication network that allows the subscriber unit to communicate with other networks or devices. A base station typically includes a base transceiver station and a base station controller. The base transceiver station communicates signals to and from one or more subscriber units. The base station controller manages the operation of the base transceiver station.

Either or both of communication devices 20a or 20b may include one or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band.

A communication link between communication devices 20a and 20b such as wireless link 24 may be a radio frequency link that is cellular in network organization. Wireless link 24 may be used to communicate a signal between communication devices 20a and 20b.

As described more fully below, according to embodiments of the present invention, modifying communication device 20a may include a signal modifier 28 that modifies one or more signals. Signal modifier 28 may then modify the transmit signal in accordance with virtual diversity information corresponding to the virtual diversity parameters According to one embodiment, modifying a signal may refer to modifying a signal feature. A transmission signal feature, or in some embodiments of the invention, a transmit diversity parameter, may refer without limitation to any feature of the transmission, for example, relative phase, relative amplitude, relative power, absolute power, frequency, timing, other suitable signal feature that may be modulated, or any combination of the preceding. Relative phase may refer to the phase difference between the phase of a first signal of a first transmit antenna element and the phase of a second signal of a second transmit antenna element. Relative power may refer to the ratio between the power of a first signal of a first transmit antenna element and the power of a second signal of a second transmit antenna element, which ratio may be defined on a linear or logarithmic scale. Relative amplitude may refer to the ratio between the amplitude of a first signal of a first transmit antenna element and the amplitude of a second signal of a second transmit antenna element. Absolute power may refer to the total power transmitted by all antennas of modifying communication device 20a. According to one embodiment, modifying a signal may be described as adjusting a nominal value of a transmit diversity parameter. As described more fully herein, according to an embodiment of the invention, adjustment of a transmit diversity parameter may comprise computing virtual diversity parameters and then using a combination of said virtual parameters to compute an actual diversity parameter.

A modifying communication device 20a calculates transmit diversity parameters for use in transmitting across wireless link 24. Modifying communications device 20a may modify actual transmit diversity parameters for transmission to receiving communication device 20b using values derived from virtual diversity parameters.

According to one embodiment of the invention, modifying communication device 20a may include a diversity parameter generator 30 and a signal modifier 28. Diversity parameter generator 30 may generate parameters for controlling transmit diversity of modifying communication device 20a. The parameters may be generated by any suitable manner, for example, based on feedback from the receiving communication device 20b, actual environmental conditions at the modifying communication device 20a, one or more performance parameters measured at modifying communication device 20a, or other indications. Signal modifier 28 may modify a pre-transmission signal in accordance with one or more transmit diversity parameters obtained from diversity parameter generator 30.

Alterations or permutations such as modifications, additions, or omissions may be made to communication network 10 without departing from the scope of the invention. Additionally, operations of communication network 10 may be performed using any suitable logic comprising software, hardware, other logic, or any suitable combination of the preceding.

Figure 2:
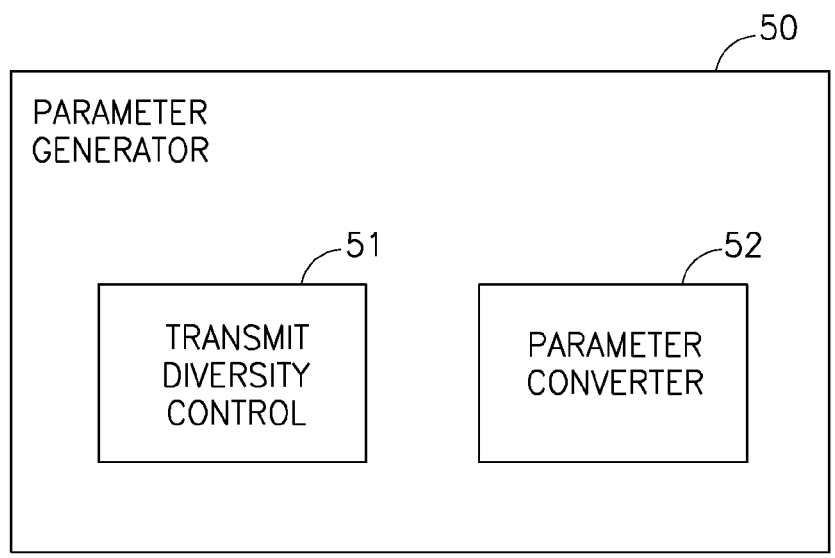
FIG. 2 depicts a block diagram of a diversity parameter generator according to an embodiment of the present invention.

FIG. 2 is a block diagram of a parameter generator module 50 according to an embodiment of the invention that includes a transmit diversity control module 51 that may be used in network 10. In some embodiments, parameter generator module 50 may comprise at least part of parameter generator 30 depicted in FIG. 1, however, it will be noted that other configurations for the parameter generator 30 are possible and within the scope of the invention. Parameter generator module 50 may include a transmit diversity control module 51 and a virtual to actual parameter converter module 52.

In operation, inputs may be received by transmit diversity control module 51, which may compute virtual diversity parameters. In an embodiment of the invention, transmit diversity control module may compute the virtual diversity parameters from the inputs and/or from diversity parameters that may be fed back from virtual to actual parameter converter module. Virtual parameters generated by transmit diversity control module 51 may be received by virtual to actual parameter converter module 52, which in turn may convert virtual parameters into actual parameters. These actual parameters may be used for implementing transmit diversity, for example, using signal modifier 28 in FIG. 1.

Alterations or permutations such as modifications, additions, or omissions may be made to parameter generator module 50 without departing from the scope of the invention. For example, parameter generator module 50 may have more, fewer, or other sub-modules. Additionally, operations of parameter generator module 50 may be performed using any suitable logic comprising software, hardware, or any suitable combination of the preceding.

Figure 3:
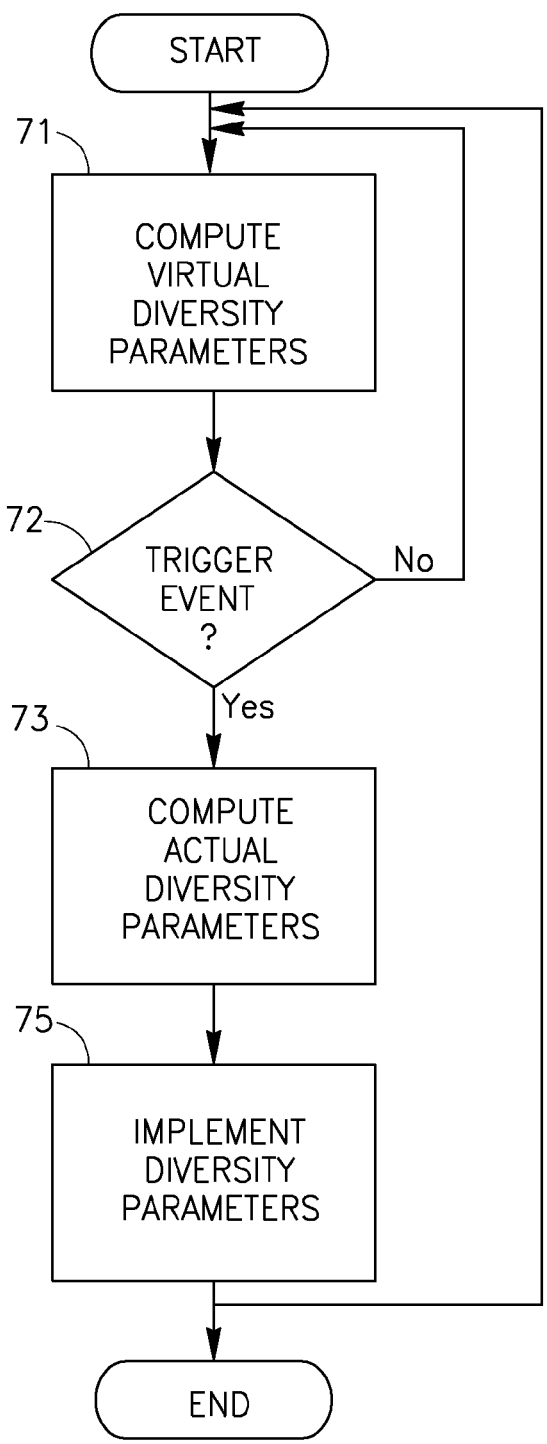
FIG. 3 is a flowchart illustrating a method in accordance with an embodiment of the present invention.

FIG. 3 is a flowchart illustrating a method in accordance with embodiments of the invention for computing actual diversity parameters from virtual diversity parameters that may be used with any suitable communication device, such as communication device 20a. At block 71, virtual diversity parameters may be computed, for example using the inputs discussed in connection with FIG. 4. It will be noted that the resolution of virtual diversity parameters may be higher than the resolution of the actual diversity parameters. Moreover, because the resolution of virtual parameters may be controlled by software, the resolution of the virtual diversity parameters may be changed to optimize the performance of the transmit diversity algorithm in use.

Upon the occurrence of a trigger event at block 72, the method may compute an actual diversity parameter, for example, based on a mapping. In one embodiment of the invention, the mapping computation may include quantization of the virtual diversity parameter to an actual diversity parameter. In another embodiment of the invention, mapping may include re-scaling a parameter from a first scale or resolution to a second scale or resolution. Embodiments of the invention may also include a variety or combination of suitable mapping computations. Suitable mappings may include without limitation, for example, first order mapping based on the virtual parameter value, such as quantization or re-scaling; higher order mapping, such as based on change in virtual parameter values, a difference between the virtual and the actual parameters, or a higher-order function based on such differences; a hysteresis mapping that take into account different computation thresholds for different directions of change of a virtual parameter value, or, different computation thresholds based on past changes of the virtual parameter value. Other mappings or mapping computations may be used, for example, as described in further embodiments below.

In one embodiment, the trigger event at block 72 may be, for example, the lapse of a predetermined time, for example, a regularly recurring time interval. In another embodiment, a trigger event at block 72 may be the virtual diversity parameter crossing a predefined threshold. Other trigger events for mapping may be used, for example, triggers based on the rate of change of the diversity parameter, the availability of new inputs, etc. The computation of actual diversity parameters at block 73 may include, for example, using an equation with one or more virtual diversity parameters to quantize or otherwise compute an overall diversity parameter, thus representing one or multiple input values with a single actual diversity value. The actual diversity parameter may then be used at block 75 to implement control of a diversity parameter. Alterations or permutations such as modifications, additions, or omissions may be made to the method without departing from the scope of the invention. The method may include more, fewer, or other steps.

In one embodiment of the invention, the actual diversity parameter may be absolute or relative phase. For example, the actual phase may have 36 distinct actual output values, with a step between values of, for example, 10 degrees, while virtual phase may have 360 distinct values, with a step between values of, for example, 1 degree.

Figure 4:
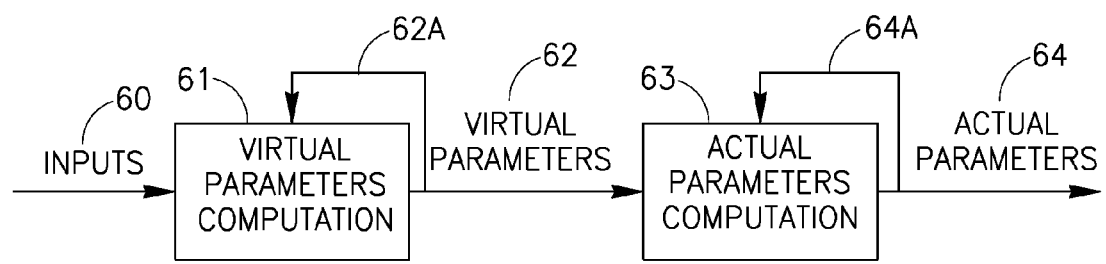
FIG. 4 is a diagram illustrating data flow according to an embodiment of the present invention.

FIG. 4 is a diagram illustrating a data flow according to an embodiment of the invention for computing actual diversity parameters from virtual diversity parameters that may be used with any suitable communication device, such as communication device 20a. At block 61, inputs 60 are received. Inputs for computation of virtual diversity parameters may be any or all of feedback from the receiving communication device 20b, including one or more quality indication signals; actual environmental conditions at the modifying communication device 20a; one or more performance parameters measured at modifying communication device 20a, for example, the error bit rate, the power amplification, or other indications. At block 61, virtual diversity parameters are computed based on the received inputs 60. As indicated by arrow 62A, previous virtual parameters 62 may optionally be fed back and considered in conversion of inputs 60 to actual parameters 62. Virtual parameters 62 may be mapped or converted at block 63 to actual diversity parameters 64. As discussed below, there may be many possible conversion algorithms for the mapping or conversion of virtual diversity parameters 62 to actual diversity parameters 64.

According to one embodiment of the invention, the above conversions may consist of mapping the inputs of block 61 and/or block 63 to the outputs of such blocks by means of quantization. For example, quantization may include grouping one or more virtual diversity parameter together and representing the one or more parameters by a single output parameter. According to another embodiment of the invention, the mapping conversion may be based on the difference between the inputs to block 61 and/or 63 and the value of a present state variable related to the output of the block. According to another embodiment of the invention, hysteresis may be applied to the conversion to prevent small changes in the inputs from causing changes in the output of the computation block. According to another embodiment of the invention, a delay may be introduced after changes in output of the computation block to control the rate of change of this output.

As indicated by arrow 64A, actual diversity parameters may optionally be fed back and considered in conversion of virtual parameters 62 to actual parameters 64. Finally, actual diversity parameters 64 may be implemented, for example, by being sent to a signal modifier and/or being used in a transmission signal. For example, actual diversity parameters may be used to control transmit diversity hardware. Alterations or permutations such as modifications, additions, or omissions may be made to the method without departing from the scope of the invention. The method may include more, fewer, or other steps.

Figure 5:
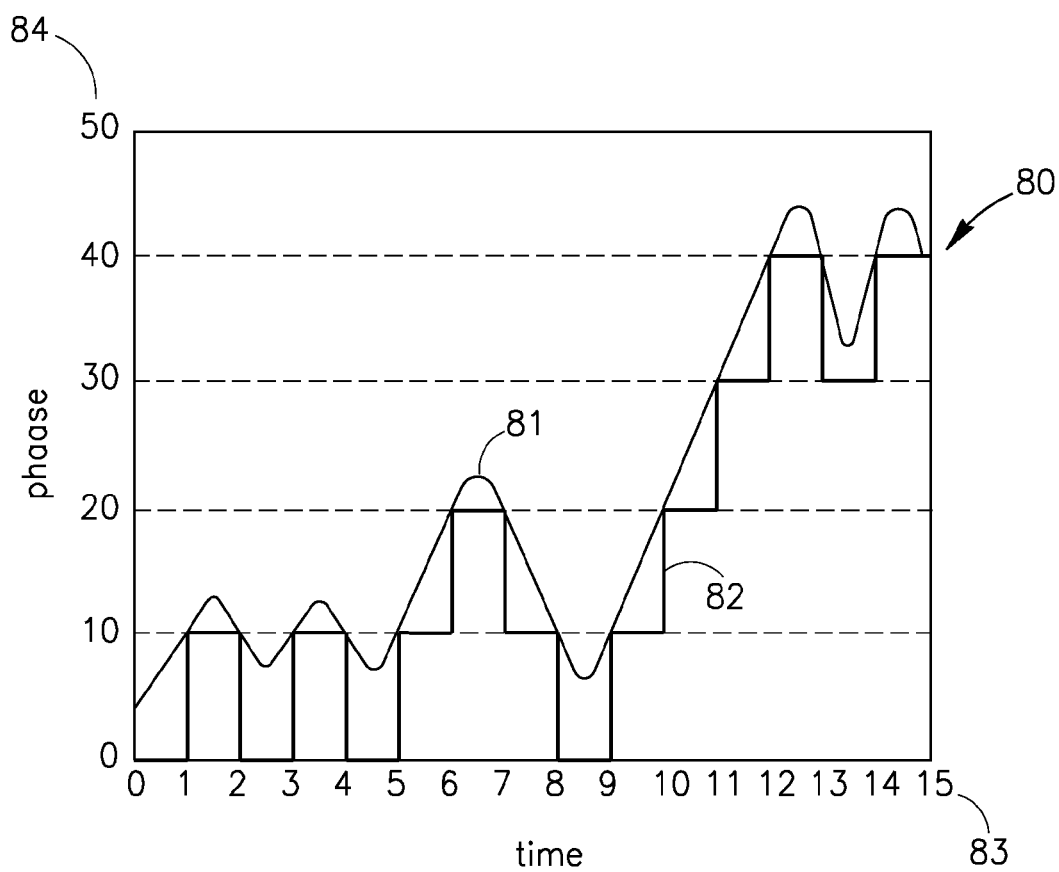
FIG. 5 is a graph illustrating a quantized signal according to an embodiment of the present invention.

FIG. 5 is a graph 80 plotting time on axis 83 against phase on axis 84, illustrating quantization of virtual diversity parameters in accordance with an embodiment of the invention. In some embodiments of the invention, a quantization algorithm or technique may refer to grouping one or more virtual diversity parameters together and representing them by an output parameter. In FIG. 5, virtual diversity parameter is depicted by curve 81. Virtual diversity parameter 81 may be measured one or more times during a time interval. In the embodiment depicted at FIG. 5, at each time interval, an actual diversity parameter 82 may be generated, based for example on the value or some combination of the values of the virtual diversity parameter 81 measured during the time interval or at a terminus of the time interval. In another embodiment, the actual diversity parameter may take its value based on the value of the virtual diversity parameter crossing a threshold value. In the embodiment depicted, the virtual diversity parameter 81 has higher resolution than actual diversity parameter 82.

At each time interval, the output phase 82 may be computed based on the virtual phase 81 by quantizing the virtual phase 81 using, for example, a rounding or a truncating method where the virtual phase values 81 are rounded to the nearest increment, e.g. 10 degrees, to establish the output phase value 82. According to an embodiment of the invention, the rounding may be accomplished by, for example, implementing the computation $\Phi_{act}=[10*\text{floor}((\Phi_{virt}+5)/10)]$ mod 360, where the floor function refers to truncating the fractional or decimal part of the argument and returning its integer part. Thus, for example, if $\Phi_{virt}=16$, then floor$((\Phi_{virt}+5)/10)$ would return 2, and $\Phi_{act}=20$. In another embodiment of the invention, the virtual phase 81 may be quantized using, for example, a floor method where the virtual phase values 81 are truncated to the lowest 10 degree increment, e.g., $\Phi_{act}=[10*\text{floor}(\Phi_{virt}/10)$, to establish the output phase value 82. Variations on conversion values are possible, for example, using $\Phi_{act}=b*\text{floor}((\Phi_{virt}+a)/b)$, where a and b are other values; for example, when virtual phase has 90 values 4 degrees apart and actual phase has 30 values 12 degrees apart, a recommended selection could be a=6, e.g., half the step of the actual phase, and b=12, e.g., the actual step of the phase. Other embodiments may use, for example, other integer conversion methods of the virtual phase.

In some embodiments, the quantization may be performed at regular intervals, e.g., the trigger event is the passing of a predetermined time interval. In other embodiments, quantization may be performed when the virtual diversity parameter reaches or crosses one or any number of predetermined thresholds, for example, in an embodiment in which actual phase has 36 discrete values, the trigger event for quantization may be when $\Phi_{virt}$ crosses any 10N degree threshold for a minimum period of time, where N is any integer.

Figure 6:
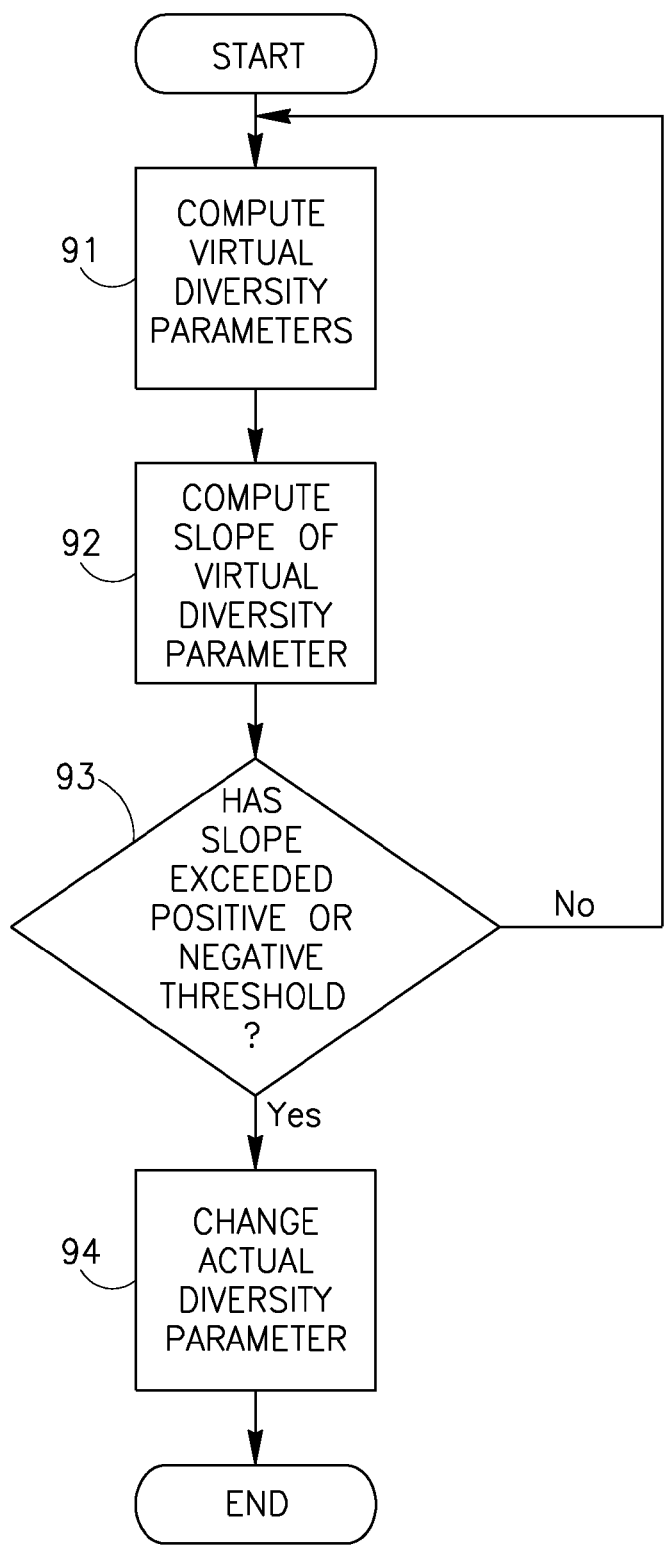
FIG. 6 is a flowchart illustrating a method for computing diversity parameters using difference signals according to an embodiment of the present invention.

In an embodiment of the invention, the computation of actual diversity parameter from virtual diversity parameters may include calculations based on the slope or rate of change of virtual diversity parameters. For example, FIG. 6 is a flowchart illustrating a method for computing actual diversity parameters from the rate of change in virtual diversity parameters in accordance with an embodiment of the present invention, usable with any suitable communication device such as communication device 20a. At block 91, virtual diversity parameters may be computed, for example, with a differential equation or a difference equation of the input parameters. At block 92, based on the virtual diversity parameters computed, a slope or rate of change of virtual diversity parameters may be computed. In an embodiment of the invention, the rate of change may be substantially instantaneous, or in another embodiment of the invention, for example, in order to reduce jitter or variability of actual diversity parameter, the slope may be computed using virtual diversity parameter data over a period of time, denoted below as D1.

At block 93, a trigger event may be tested, for example, the slope may be tested to determine whether it has exceeded a positive threshold or fallen below a negative threshold. If no trigger event has occurred, the actual diversity parameter may be unchanged and the computations of blocks 91 and 92 may repeat. If a trigger event has occurred, the actual diversity parameter may be computed at block 94. Thus, for example, if a positive threshold is exceeded, the actual output parameter may be increased by an increment at block 94. If a negative threshold is surpassed negatively, the actual output parameter may be decreased by an increment at block 94. In one embodiment of the invention, changes in actual phase may not be made more frequently than once every delay period, denoted below as D2.

In an embodiment of the invention, the decision may be made by referring to the following condition:

If $(|\Phi_{virt,\,n} - \Phi_{virt,\,n-D1}| > \Delta\Phi_{th}$ AND $(n-n_{prev}) > D2)$
then set $\Phi_{act,\,n+1} = \Phi_{act,\,n} + \Delta\Phi^* \text{sign}(\Phi_{virt,\,n} - \Phi_{virt,\,n-D1})$
else set $\Phi_{act,\,n+1} = \Phi_{act,\,n}$,
where
$\Phi_{virt,\,n}$ and $\Phi_{virt,\,n+1}$ are the virtual phase computed for intervals n and n+1, respectively,
$\Delta\Phi$ is the step increment of the actual phase,
$\Delta\Phi_{th}$ is a threshold value in virtual phase required for change in actual phase,
$\Phi_{act,\,n}$ and $\Phi_{act,\,n+1}$ are the actual phase computed for intervals n and n+1, respectively,
$n_{prev}$ is the time of the immediately preceding change of actual phase,
D1 is the time interval over which the slope of the virtual phase parameter is computed, and
D2 is the minimum time interval between changes of actual phase.

Figure 7:
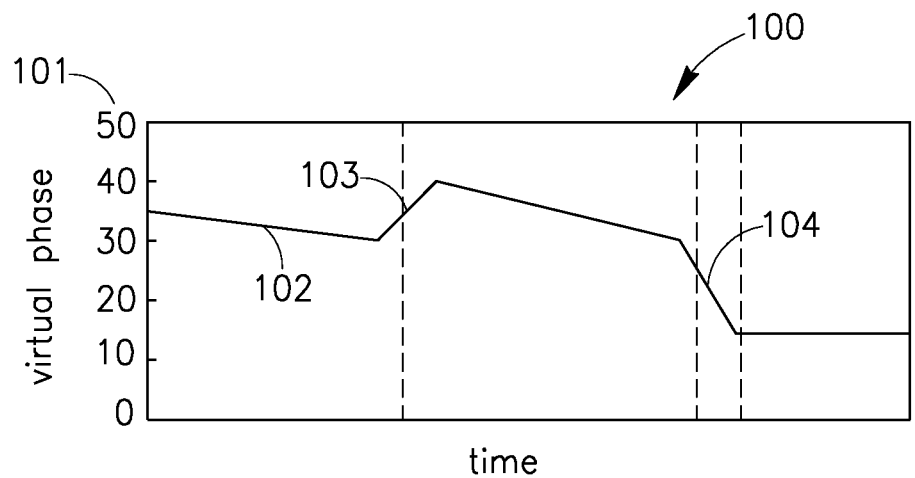
FIG. 7 is a graph illustrating a virtual diversity parameter changing with time according to an embodiment of the present invention.
Figure 8:
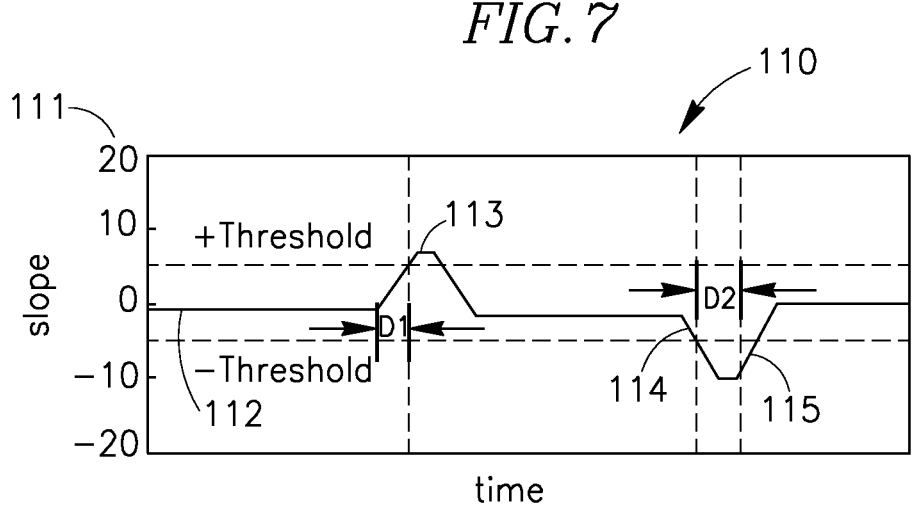
FIG. 8 is a graph illustrating a slope of a virtual diversity parameter according to an embodiment of the present invention.
Figure 9:
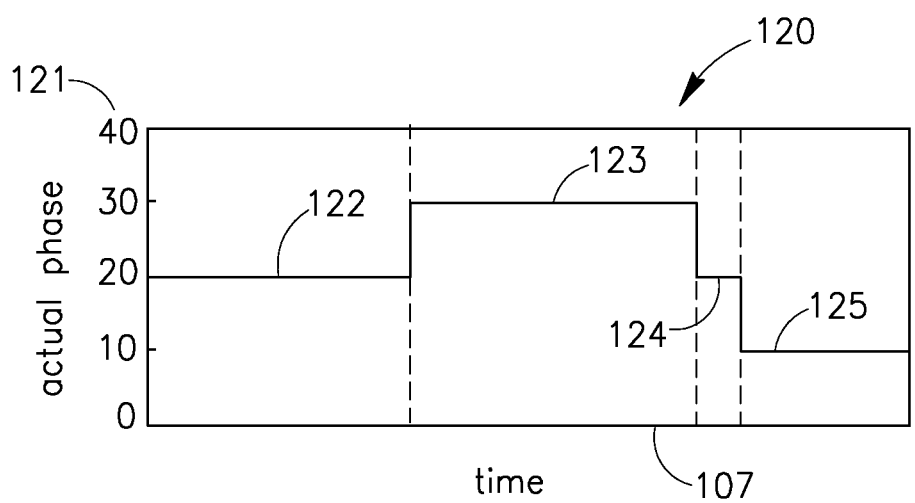
FIG. 9 is a graph illustrating an actual diversity parameter adjusted at different time periods according to an embodiment of the present invention.

FIGS. 7, 8 and 9 depict graphs 100, 110 and 120 plotting on a common time axis 107, values of virtual phase on axis 101, virtual phase slope on axis 111, and actual phase on axis 121, according to an example provided in accordance with an embodiment of the invention described above.

Initially, at segment 102, virtual phase is decreasing at a constant rate, and accordingly, at segment 112, the slope is a negative constant. Because the slope has not crossed either the positive threshold or the negative threshold, the actual phase remains unchanged at segment 122. When virtual phase increases steadily at segment 103, the slope begins to rise. In the embodiment depicted, slope measurement time period D1 is taken as the time period over which the slope is computed, for example, in order to avoid sudden or immediate changes in slope, and hence actual phase. Accordingly, at a time D1 after the change between segment 102 and 103, the slope reaches a constant positive value at segment 113. It will be recognized that increasing D1 will result in a gentler slope and slower response of actual phase, and decreasing D1 will result in a sharper slope and faster response of the actual phase. In the present example, segment 113 passes the positive threshold, and accordingly, the actual phase is increased by an increment, for example, 10 degrees, at segment 123. It will be noted that in the present embodiment, actual phase may not change as long as the slope is lower than a high threshold and higher than a low threshold. In some embodiments of the invention, the virtual diversity parameters used in slope measurement time interval D1 may be weighted, for example, by taking a weighted averaging in which more recent virtual diversity values are given a greater weight than less recent virtual diversity parameter values.

Another feature of the embodiment depicted in FIGS. 7, 8 and 9 is the minimum time delay between actual phase changes. At segment 104, the virtual phase drops sharply, and at segment 114, the slope drops below the negative threshold, resulting in the decrement of actual phase at segment 124. After minimum time period D2, at which point the slope is still below the negative threshold, the actual phase may be further decremented at segment 125.

It will be recognized that while the example above is based on relative phase, any transmit diversity parameter may be used, for example, relative amplitude, relative power, frequency of change, timing of application of the transmit diversity controls, or other parameters.

In an embodiment of the invention, the decision to change an actual diversity parameter may incorporate a hysteresis factor, for example, using the following condition that modifies the quantization embodiments:

If $(|\Phi_{virt,\,n+1} - \Phi_{act,\,n}| > \Delta\Phi_{th})$
then set $\Phi_{act,\,n+1} = \Phi_{act,\,n} + \Delta\Phi^* \text{sign}(\Phi_{virt,\,n+1} - \Phi_{act,\,n})$
else set $\Phi_{act,\,n+1} = \Phi_{act,\,n}$,
where
$\Phi_{virt,\,n+1}$ is the virtual phase computed for interval n+1,
$\Delta\Phi$ is the step increment of the actual phase,
$\Delta\Phi_{th}$ is a threshold value in virtual phase required for change in actual phase, and
$\Phi_{act,\,n}$ and $\Phi_{act,\,n+1}$ are the actual phase computed for intervals n and n+1, respectively.

Hysteresis may be similarly applied to the embodiment considering differential or difference values, by varying the thresholds at which diversity control parameters are modified. Increase of the absolute value of the thresholds will lead to damping the changes, whereas decrease of these absolute values will accelerate the response.

In some embodiments, the hysteresis threshold may be dependent on the value of the virtual phase or a combination of the value of the virtual phase and its slope, or differences in the discrete case.

In some embodiments of a system implementing hysteresis, the output diversity control parameters may not be changed unless the value of the virtual phase or a combination of the value of the virtual phase and its slope, or differences in the discrete case, exceeds a threshold.

Figure 10:
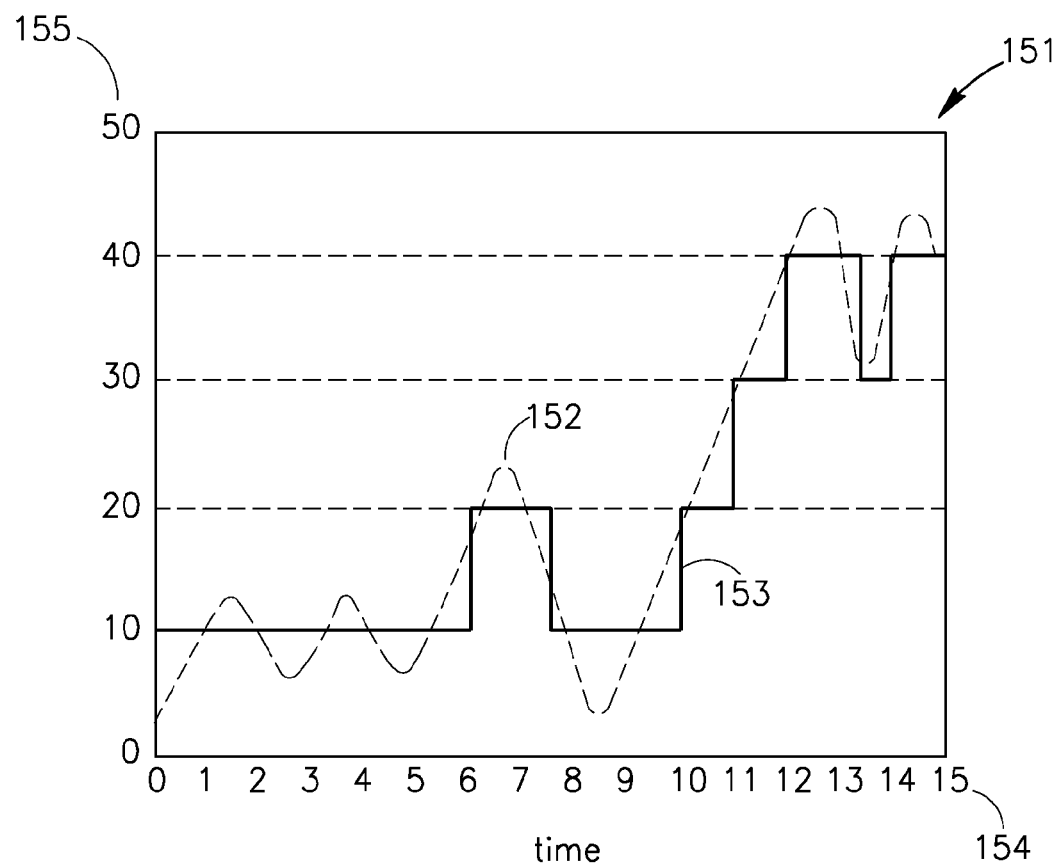
FIG. 10 is a graph illustrating an example of signal with hysteresis according to an embodiment of the present invention.

FIG. 10 is a graph 151 plotting phase on axis 155 against time on axis 154, illustrating quantization of virtual diversity parameters in accordance with an embodiment of the invention including hysteresis. In the example shown in FIG. 10, a hysteresis threshold of $\Delta\Phi_{th} = 8°$ may be set. Thus, the actual phase at time $\Phi_{act,n+1}$, representing the actual phase at time n+1, may be changed at time n based on a change in virtual phase as measured with respect to the actual phase at time n, e.g., $|\Phi_{act,\,n+1} - \Phi_{virt,\,n}|$, of more than $\Delta\Phi_{th} = 8°$. It will be understood that any other suitable value for $\Delta\Phi_{th}$ may be used. It will further be understood that hysteresis may be used in conjunction with the method described by FIG. 6, or by any other embodiment of the present invention.

Accordingly, virtual diversity parameter, depicted as curve 152, may be measured one or more times during a time interval, and for each time interval an output parameter 153 may be generated, for example, based on the values or some combination of the values of the virtual diversity parameter 152 measured during the time interval. In the illustrated example, a hysteresis function is applied to the quantization, in which an incremental change in actual phase, for example, $\Delta\Phi=10°$, occurs when the difference between actual phase and virtual phase is a threshold difference, e.g., $\Delta\Phi_{th}=8°$. Thus, for example, the fluctuations in virtual phase 152 depicted between time 0 to time 5 do not produce a change in actual phase 153. Rather, however, when the difference between actual and virtual phase is greater than the threshold value, the actual phase may be changed. According to embodiments of the invention, the trigger event for the mapping conversion may be the lapse of a predetermined period of time, or the occurrence of an event, for example, a virtual parameter crossing a conversion threshold, thereby requiring changing the actual parameter.

It will be recognized that some embodiments of the invention using hysteresis may take into account the instantaneous value of virtual transmit diversity parameter, while some embodiments may take into account the outcomes of the virtual diversity parameter over a time interval. In some embodiments of the invention taking into account historical outcomes of a virtual transmit diversity parameter, the historical values of virtual diversity parameter may be weighted by a set of weights, for example, giving more recent parameters greater weight than more distant parameters, thereby accelerating the response of the actual diversity parameter in response to recent changes in the virtual diversity parameters. History other than hysteresis may be used as part of the method of determining actual parameters from virtual parameters.

The following conditions may illustrate one such example, where a weighted sum of previous values may be used to determine when the value of the actual phase should be changed, and to which new value:

If $$\left|\sum_{i=0}^{K} \Delta\Phi_{virt,n-i} \cdot W_i\right| \rangle \Delta\Phi_{th},$$

then set $$\Phi_{act,n+1} = \Phi_{act,n} + \Delta\Phi \cdot \mathrm{sign}\left(\sum_{i=0}^{K} \Delta\Phi_{virt,n-i} \cdot W_i\right),$$

else set $\Phi_{act, n+1} = \Phi_{act, n}$,
where
$\Delta\Phi_{virt, n} = \Phi_{virt, n} - \Phi_{virt, n-1}$, and
$W_i$ represents a set of weights, $W_i \rangle w_{i-1}$.

Embodiments of the invention may apply to any transmit diversity control method. It will be understood that the methods discussed herein may be integrated with any transmit diversity control algorithm. It will further be understood that the present invention may be implemented as a stand-alone processing module, or may be integrated into a transmit diversity control processor, algorithm, or signal path circuitry.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for modifying a transmit diversity signal comprising:
   receiving at least one input parameter;
   calculating at least one virtual parameter based on said at least one input parameter;
   converting said at least one virtual parameter into an actual parameter; and
   modifying a transmit diversity signal based on said actual parameter,
   wherein said actual parameter has a discrete value having lower resolution than said at least one virtual parameter,
   wherein converting said at least one virtual parameter into said actual parameter comprises mapping any of a plurality of virtual parameter values to a single actual parameter value, and
   wherein converting said at least one virtual parameter into said actual parameter comprises truncating said virtual parameter to obtain said actual parameter value, where the truncation is performed according to the formula:

$$\Phi_{act} = b \ast \mathrm{floor}((\Phi_{virt} + a/b),$$

where $\Phi_{virt}$ is a virtual parameter,
   $\Phi_{act}$ is an actual parameter, and
   a and b are selected numerical values.

2. The method of claim 1, wherein said actual parameter comprises a parameter selected from the group consisting of: relative phase, relative amplitude, relative power, frequency of modification, and timing of application of said transmit diversity signal.

3. The method of claim 1, wherein converting said at least one virtual parameter into said actual parameter comprises performing a calculation based on an amount of change in said virtual parameter over a slope-measurement time interval.

4. The method of claim 3, wherein converting said at least one virtual parameter into said actual parameter comprises determining whether an increase in said virtual parameter over the slope-measurement time interval exceeds a threshold value.

5. The method of claim 3, wherein converting said at least one virtual parameter into said actual parameter comprises determining whether the absolute value of a decrease in said virtual parameter over the slope-measurement time interval exceeds a threshold value.

6. The method of claim 3, wherein converting said at least one virtual parameter into said actual parameter further comprises converting said at least one virtual parameter into said actual parameter only if no change was made to said actual parameter within a previous minimum time interval.

7. The method of claim 3, wherein performing a calculation based on an amount of change in said virtual parameter over a slope-measurement time interval comprises performing a weighted averaging of a plurality of virtual parameter values over said slope-measurement time interval.

8. The method of claim 1, wherein converting said at least one virtual parameter into an actual parameter comprises determining whether a change in said at least one virtual parameter exceeds a threshold, wherein said threshold is based on at least one previous value of said virtual parameter.

9. The method of claim 1, wherein converting said at least one virtual parameter into said actual parameter comprises performing a weighted averaging of a plurality of previous virtual parameter values over a measurement time interval.

10. The method of claim 1, wherein each parameter is a phase.

11. The method of claim 1, wherein the actual parameter and the virtual parameter are relative phases and the truncation formula is applied modulo 360.

12. A method for modifying a transmit diversity signal comprising:
   receiving at least one input parameter;
   calculating at least one virtual parameter based on said at least one input parameter;
   converting said at least one virtual parameter into an actual parameter; and
   modifying a transmit diversity signal based on said actual parameter,
   wherein converting said at least one virtual parameter into said actual parameter comprises determining whether a difference between said at least one virtual parameter and an actual parameter value exceeds a hysteresis threshold value, wherein the hysteresis threshold value is determined from the following formula:

If $(|\Phi_{virt,n} - \Phi_{act,n}| > \Delta\Phi_{th})$ then set $\Phi_{act,n+1} = \Phi_{act,n} + \Delta\Phi * \text{sign}(\Phi_{virt,n+1} - \Phi_{act,n})$ else set $\Phi_{act,n+1} = \Phi_{act,n}$, where
   $\Phi_{virt, n+1}$ is the virtual parameter computed for interval n+1,
   $\Delta\Phi$ is the step increment of the actual parameter,
   $\Delta\Phi_{th}$ is a threshold value in virtual parameter required for change in actual parameter, and
   $\Phi_{act, n}$ and $\Phi_{act, n+1}$ are the actual parameter computed for intervals n and n+1, respectively.

13. A method for modifying a transmit diversity signal comprising:
   receiving at least one input parameter;
   calculating at least one virtual parameter based on said at least one input parameter;
   converting said at least one virtual parameter into an actual parameter; and
   modifying a transmit diversity signal based on said actual parameter,
   wherein the timing of said converting said at least one virtual parameter into an actual parameter is based on a trigger function, and wherein the trigger function comprises the following:

If $(|\Phi_{virt,n} - \Phi_{virt,n-D1}| > \Delta\Phi_{th}$ AND $(n - n_{prev}) > D2)$ then set $\Phi_{act,n+1} = \Phi_{act,n} + \Delta\Phi * \text{sign}(\Phi_{virt,n} - \Phi_{virt,n-D1})$ else set $\Phi_{act,n+1} = \Phi_{act,n}$, where
   $\Phi_{virt, n}$ and $\Phi_{virt, n+1}$ are the virtual parameter computed for intervals n and n+1, respectively,
   $\Delta\Phi$ is the step increment of the actual parameter,
   $\Delta\Phi_{th}$ is a threshold value in virtual parameter required for change in actual parameter,
   $\Phi_{act, n}$ and $\Phi_{act, n+1}$ are the actual parameter computed for intervals n and n+1, respectively,
   $n_{prev}$ is the time of the immediately preceding change of actual parameter,
   D1 is the time interval over which the slope of the virtual parameter is computed, and
   D2 is the minimum time interval between changes of actual parameter.

14. The method of claim 13, wherein said trigger function is based on the lapse of a predetermined time interval.

15. The method of claim 13, wherein each parameter is a phase.

16. An apparatus adapted to modify a transmit diversity signal, the apparatus comprising:
   a processor to calculate at least one virtual parameter based on at least one input parameter, convert said at least one virtual parameter to an actual parameter, and modify said transmit diversity signal based on said actual parameter,
   wherein converting said at least one virtual parameter into said actual parameter comprises determining whether a difference between said virtual parameter and an actual parameter value exceeds a hysteresis threshold value, and wherein the hysteresis threshold value is determined from the following formula:

If $(|\Phi_{virt,n+1} - \Phi_{act,n}| > \Delta\Phi_{th})$ then set $\Phi_{act,n+1} = \Phi_{act,n} + \Delta\Phi * \text{sign}(\Phi_{virt,n+1} - \Phi_{act,n})$ else set $\Phi_{act,n+1} = \Phi_{act,n}$, where
   $\Phi_{virt, n+1}$ is the virtual parameter computed for interval n+1,
   $\Delta\Phi$ is the step increment of the actual parameter,
   $\Delta\Phi_{th}$ is a threshold value in virtual parameter required for change in actual parameter,
   $\Phi_{act, n}$ and $\Phi_{act, n+1}$ are the actual parameter computed for intervals n and n+1, respectively.

17. The apparatus of claim 16, wherein said processor is to convert said at least one virtual parameter into said actual parameter by performing a calculation based on an amount of change in said virtual parameter over a slope-measurement time interval.

18. The apparatus of claim 17, wherein said processor is to determine whether an increase in said virtual parameter over the slope-measurement time interval exceeds a threshold value.

19. The apparatus of claim 17, wherein said processor is to convert said at least one virtual parameter into said actual parameter only if no change was made to said actual parameter within a previous minimum time interval.

20. The apparatus of claim 17, wherein said processor is to perform a weighted averaging of a plurality of virtual parameter values over said slope-measurement time interval.

21. The apparatus of claim 16, wherein said processor is to determine whether said at least one virtual parameter exceeds a threshold, wherein said threshold is based on at least one previous value of said virtual parameter.

22. The apparatus of claim 16, wherein said processor is to perform a weighted averaging of a plurality of previous virtual parameter values over a measurement time interval.

23. The apparatus of claim 16, wherein said processor is adapted to convert said at least one virtual parameter into said actual parameter at regular time intervals.

24. A transmit diversity method comprising:
   modifying, by a modification amount, a transmit diversity signal parameter, said modification amount based on a calculation performed on at least one feedback parameter, wherein said modification is performed if a result of the calculation is based on a trigger function, wherein the timing of said converting said at least one virtual parameter into an actual parameter is based on a trigger function, and wherein the trigger function comprises the following:

If $(|\Phi_{virt,n}-\Phi_{virt,n-D1}|>\Delta\Phi_{th}$ AND $(n-n_{prev})>D2)$ then set $\Phi_{act,n+1}=\Phi_{act,n}+\Delta\Phi*\text{sign}(\Phi_{virt,n}-\Phi_{virt,n-D1})$ else set $\Phi_{act,n+1}=\Phi_{act,n}$, where $\Phi_{virt,n}$ and $\Phi_{virt,n+1}$ are the virtual parameter computed for intervals n and n+1, respectively, $\Delta\Phi$ is the step increment of the actual parameter, $\Delta\Phi_{th}$ is a threshold value in virtual parameter required for change in actual parameter, $\Phi_{act,n}$ and $\Phi_{act,n+1}$ are the actual parameter computed for intervals n and n+1, respectively, $n_{prev}$ is the time of the immediately preceding change of actual parameter, D1 is the time interval over which the slope of the virtual parameter is computed, and D2 is the minimum time interval between changes of actual parameter.

25. The method of claim 24, wherein said transmit diversity parameter comprises a parameter selected from the group consisting of: relative phase, relative amplitude, relative power, frequency of modification, and timing of application of said transmit diversity signal.

26. The method of claim 25, wherein said modification amount is a discrete parameter.

27. The method of claim 26, wherein said calculation includes quantizing the result of the calculation, and wherein said modification is performed if the result of the calculation exceeds a minimum value, and wherein said actual parameter is maintained if the result of said calculation does not exceed the minimum value.

* * * * *